United States Patent
Luo et al.

(10) Patent No.: US 7,738,429 B2
(45) Date of Patent: Jun. 15, 2010

(54) METHOD AND SYSTEM FOR UPLINK SYNCHRONIZATION

(75) Inventors: Liyun Luo, Shanghai (CN); Jian Cheng, Nanjing (CN)

(73) Assignee: Spreadtrum Communications Inc., Grand Cayman (KY)

( * ) Notice: Subject to any disclaimer, the term of this patent is extended or adjusted under 35 U.S.C. 154(b) by 751 days.

(21) Appl. No.: 11/647,536

(22) Filed: Dec. 27, 2006

(65) Prior Publication Data

US 2007/0160029 A1    Jul. 12, 2007

(30) Foreign Application Priority Data

Dec. 27, 2005    (CN) .................... 2005 1 0112070

(51) Int. Cl.
*H04B 7/216* (2006.01)

(52) U.S. Cl. ............... 370/335; 370/350; 370/342; 370/441; 455/422.1; 455/432.1; 455/436; 455/450

(58) Field of Classification Search .............. None
See application file for complete search history.

(56) References Cited

U.S. PATENT DOCUMENTS

| 2003/0067898 A1* | 4/2003 | Challa et al. ............ 370/335 |
| 2004/0052236 A1* | 3/2004 | Hwang et al. ........... 370/342 |
| 2008/0247337 A1* | 10/2008 | Li et al. ................ 370/280 |

* cited by examiner

*Primary Examiner*—Rafael Pérez-Gutiérrez
*Assistant Examiner*—Daniel Nobile (57) ABSTRACT

This invention presents a synchronization method for uplink, and is based on UE JT technology. During downlink, UE sets up the downlink synchronization; UE undertakes the downlink channel estimation; UE, according to the estimated downlink channel estimation result, constructs transport matrix A, and the uplink synchronization code matrix d to be transmitted by UE. Then UE obtains the uplink pilot frequency transmission data s, which includes the latest downlink channel fading and multi-path information.

4 Claims, 6 Drawing Sheets

METHOD AND SYSTEM FOR UPLINK SYNCHRONIZATION

CROSS-REFERENCE TO RELATED APPLICATION

This application claims priority to Chinese Patent Application No. 200510112070.7 filed on Dec. 27, 2005, the disclosure of which is incorporated herein by reference in its entirety.

TECHNICAL FIELD

This invention relates to a synchronization technique in a digital communication system; in particular, an uplink synchronization setup technique using a combination of Joint Detection (JD) and Joint Transmission (JT), and an uplink setup synchronization technique in a TD-SCDMA system.

BACKGROUND

A TD-SCDMA system typically has a high demand for synchronization that has a great impact upon channel estimation. If there is no exact system synchronization, channel estimation can be out of window, and interferences among the system users can be great. Such interferences cannot be easily addressed. Therefore, in the access process of User Apparatus (UE) in the TD-SCDMA system, synchronization of the network side and UE should first be established. At the side of the base station, there is simultaneous access of multi-users and multi-uplink codes. Also, because of channel fading and multi-path delay, the peak value of the base station after correlation cannot reach a preset threshold, or there can be multi-peak values. Therefore, two negative aspects can arise: on one hand, the base station might have inaccurate estimation of the original synchronization of the UE, which is not favorable for synchronization setup and track. On the other hand, because of the correlation result for the multi-path condition (especially case 2, shown in Table 1) and the collision of two UE uplink synchronization codes is quite close, the collision and multi-path conditions cannot be differentiated at the base station side and can cause the original synchronization to fail.

In the TD-SCDMA system, the uplink and downlink employ the same frequency. For a time period, the downlink and uplink have the approximately similar radio propagation environment. Therefore, the channel impact of the uplink and the downlink correlate with each other in the time period, and can be identified as approximately equal.

TABLE 1 the multi-path propagation model of TD-SCDMA system

| Case 1, speed 3 km/h | | Case 2, speed 3 km/h | | Case 3, speed 120 km/h | |
|---|---|---|---|---|---|
| Relative Delay [ns] | Relative Mean Power [dB] | Relative Delay [ns] | Relative Mean Power [dB] | Relative Delay [ns] | Relative Mean Power [dB] |
| 0 | 0 | 0 | 0 | 0 | 0 |
| 2928 | −10 | 2928 | 0 | 781 | −3 |
|  |  | 12000 | 0 | 1563 | −6 |
|  |  |  |  | 2344 | −9 |

In May 2000, P. W. Baier from Kaiserslautern, Germany, and his colleagues proposed pre-equalization of multi-user environment in the Time Division Duplex Code Division Multiple Access (TDD-CDMA) mode, which is a related technology of joint detection at the side of uplink base station. This technology combines uplink JD, channel status information and pre-adaptation equalization, and constructs the multi-path and multi-address transmission signal basing on all the users. In this way, the mobile station does not need to undertake the complex channel estimation, but only simple calculation to detect the signals. JD technology has already been tested in both theories and practice. Chinese Patent Application No. of 03137628.2, titled "Joint Optimization Signal Methods of Joint Transmission Technology," which is based on Joint Detection, further proposed that JT Transmission technology, which corresponds to JD technology. According to this technology, the JD requirement of UE is shifted to the JT to the base station, and UE needs simple operation to detect the signals, so as to meet the target of decreasing the UE complexity. In this way, on one hand, JT can effectively decrease the multi-address and multi-path interferences to improve the system capacity; on the other hand, after the downlink implements JT technology, there is no need for a mobile station to undertake channel estimation, but only simple calculation to detect the signals to decrease the processing complexity and power consumption of the mobile station. However, JT technology based on UE has never been disclosed until now.

Figure 1:
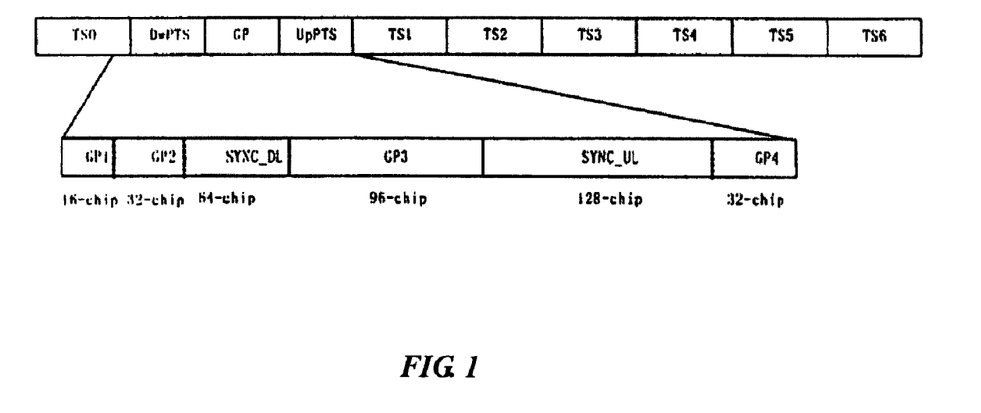
FIG. 1 is frame structure chart in TD-SCDMA system.

The frame structure of TD-SCDMA system is shown in FIG. 1. Three time slots DwPTS, GP, and UpPTS can be further separated into the following time slots: Gp1=16 chips, GP2=32 chips, SYNC_DL1=64 chips, Gp3=96 chips, SYNC_UL=128 chips, GP4=32 chips. According to the structure in FIG. 1, suppose UE undertakes JT based on the TS0 downlink channel estimation, and transmits UpPTS when UpPTS is started, the middle interval is Gp1+Gp2+SYNC_DL1+Gp3=208 chips, approximately τ=5/6400*192=0.1625 ms. According to the coefficient ratio formula, $$R_R(\tau) = \frac{1}{N}\cos\omega_c\tau\sum_{n=1}^{N}\cos\left(\varpi_m\tau\cos\frac{2\pi n}{N}\right)$$

where $\omega_c$ is carrier wave, and $\omega_m$ is the maximum Dopler shift, N is the number of the low frequency oscillators, τ is the time interval, whose coefficient ratio is 0.9997.

Figure 2:
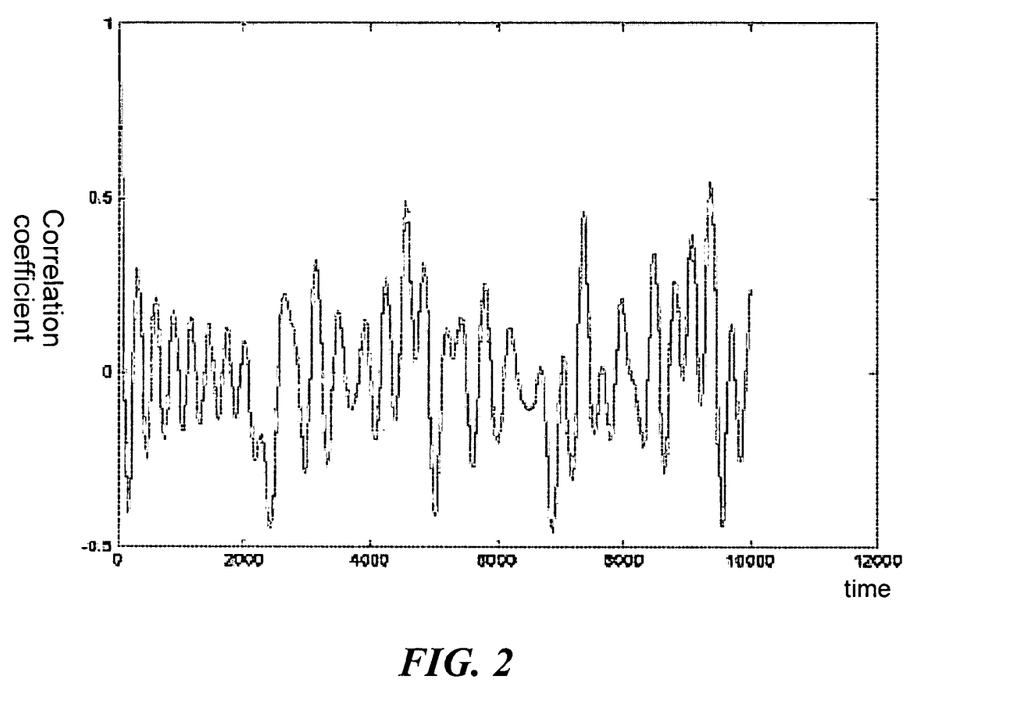
FIG. 2 is the correlation efficient chart when the mobile speed is 120 km/h, 10s.

FIG. 2 shows the coefficient ratio of the mobile speed at 120 km/h, and time is 10s. It shows that the uplink synchronization theory based on the JT technology is feasible. Hence this invention proposes a method and system for the uplink synchronization based on JT technology.

BRIEF DESCRIPTION OF THE DRAWINGS

The above-mentioned and the other features of this invention are further exemplified and demonstrated by the following figures and the embodiments. In the figures, the same figure marks designate the same features from the beginning to the end of this invention.

DETAILED DESCRIPTION

This invention relates to an uplink synchronization setup technique based on UE JT, for enabling a TD-SCDMA base station to accurately transmit downlink synchronization information to a UE for uplink setup, and to prevent undifferentiated correlation collision values of uplink synchronization codes and multi-path. Therefore, the success rate in the process of the uplink synchronization setup can be improved.

According to one aspect of the invention, an uplink synchronization method based on UE JT technology is provided. The method includes the following steps:

During downlink, UE establishes downlink synchronization;

UE calculates downlink channel estimation;

UE, according to the calculated downlink channel estimation, constructs transport matrix A, and the uplink synchronization code matrix d to be transmitted by UE. Then the UE obtains the uplink pilot frequency transmission data s, which includes the latest downlink channel fading and multi-path information.

During uplink, NodeB receives the uplink pilot frequency transmission data s, and sets up the uplink synchronization. When NodeB correlates the above-mentioned pilot frequency, there is only one path so the NodeB can obtain the exact maximum peak value. This helps the NodeB in determining the advance and the delay of UE transmission.

More advantageously, the UE calculates the downlink channel estimation to receive BCH or DwPCH for channel estimation. Moreover, the above-mentioned channel estimation includes the channel estimation and weight slide toward the multiple received BCH or DwPCH.

The UE, according to the calculated downlink channel estimation, constructs the transport matrix A, and the uplink synchronization code matrix d to be transmitted by the UE. The uplink pilot frequency transmission data s, transport matrix A and the uplink synchronization code matrix have the following relationship:

$$d = A * s + n$$

where n is the noise component.

Furthermore, the method of Zero-Force Block Linear Equalizer is used according to the following formula to produce the uplink pilot frequency transmission data s:

$$\hat{S}_{c,MMSE-BLE} = (A^H A + \sigma_n^2 I)^{-1} A^H d = R_{MMSE}^{-1} A^H d$$

where I is the unit matrix, $A^H d$ is the matching filter process, and $R_{MMSE}^{-1}$ is the de-correlation multi-user detection operation.

Alternatively, in the method described above, the UE, according to the calculated downlink channel estimation result, constructs the transport matrix A, and the uplink synchronization code matrix d to be transmitted by the UE. The uplink pilot frequency transmission data s, transport matrix A and the uplink synchronization code matrix have the following relationship:

$$d = A * s + n$$

where n is noise component.

Furthermore, the method of Minimum Mean Square Error Block Linear Equalizer (MMSE-BLE) is used according to the following formula to produce the uplink pilot frequency transmission data s:

$$\hat{S}_{c,MMSE-BLE} = (A^H A + \sigma_n^2 I)^{-1} A^H d = R_{MMSE}^{-1} A^H d$$

where $\sigma_n^2$ is noise power, I is unit matrix, $A^H d$ is the matching filter process, and $R_{MMSE}^{-1}$ is the de-correlation multi-user detection operation.

More advantageously, in the step of the NodeB receiving the uplink pilot frequency transmission data s and setting up the uplink synchronization, the NodeB receives the uplink pilot frequency s and uses 8 uplink pilot frequency codes with the receiving signals to correlate for 8 times to evaluate the accessed uplink pilot frequency codes to determine whether the conditions for the uplink synchronization setup are met. If the conditions are met, the NodeB transmits FPACH in the pre-determined time slot to the UE for uplink synchronization setup. Otherwise, there is no response and UE fails in setting up the uplink synchronization. In this process, the conditions for the above-mentioned uplink synchronization setup indicate that the peak value is in the designated window, and the corresponding access threshold is reached.

Another aspect of this invention relates to an uplink synchronization system that implements UE JT technology. The system includes:

In the UE:

Downlink synchronization setup apparatus that establishes the downlink synchronization for UE;

Downlink channel estimation apparatus that estimates the downlink channel;

Uplink pilot frequency transmission data generation apparatus that, according to the estimated downlink channel estimation value, constructs the transport matrix A and the uplink synchronization code matrix d to be transmitted by the UE, and produces the uplink pilot frequency transmission data s, which includes the latest downlink channel fading and multi-path information.

In the NodeB:

Uplink synchronization setup apparatus that receives the uplink pilot frequency transmission data s in the uplink, and constructs the uplink synchronization. Here when NodeB correlates the above-mentioned uplink pilot frequency transmission data s, there is only one path and the NodeB can obtain the exact maximum peak value such that the NodeB can more accurately determine the advance and the delay of the UZ transmission apparatus.

More advantageously, in the UE, the downlink channel estimation receives BCH or DwPCH for channel estimation. Moreover, the above-mentioned channel estimation apparatus performs channel estimation and weight slide of received multiple BCH or DwPCH.

In the synchronization system described above, the uplink pilot frequency transmission data generation apparatus, according to the estimated downlink channel estimation, constructs transport matrix A, and the uplink synchronization code matrix d to be transmitted by UE. The uplink pilot frequency transmission data s, transport matrix A and the uplink synchronization code matrix have the following relationship.

$$d = A * s + n$$

where n is noise component.

Furthermore, the method Zero-Force Block Linear Equalizer is used according to the following formula to produce the uplink pilot frequency transmission data s:

$$\hat{S}_{c,MMSE-BLE} = (A^H A + \sigma_n^2 I)^{-1} A^H d = R_{MMSE}^{-1} A^H d$$

where I is the unit matrix, $A^H d$ is the matching filter process, and $R_{MMSE}^{-1}$ is the de-correlation multi-user detection operation.

Alternatively, the uplink pilot frequency transmission data generation apparatus, according to the calculated downlink channel estimation result, constructs transport matrix A, and the uplink synchronization code matrix d to be transmitted by the UE. The uplink pilot frequency transmission data s, transport matrix A and the uplink synchronization code matrix have the following relationship.

$$d = A*s + n$$

where n is noise component.

Furthermore, the method of Minimum Mean Square Error Block Linear Equalizer (MMSE-BLE) is used according to the following formula to produce the result of uplink pilot frequency transmission data s:

$$\hat{S}_{c,MMSE-BLE} = (A^H A + \sigma_n^2 I)^{-1} A^H d = R_{MMSE}^{-1} A^H d$$

where $\sigma_n^2$ is noise power, I is unit matrix, $A^H d$ is the matching filter process, and $R_{MMSE}^{-1}$ is the de-correlation multi-user detection operation.

More advantageously, the uplink synchronization setup apparatus receives the uplink pilot frequency transmission data s and sets up the uplink synchronization, using 8 uplink pilot frequency codes with the receiving signals to correlate for 8 times to evaluate the accessed uplink pilot frequency codes to determine whether the conditions for the uplink synchronization setup are met. If the conditions are met, the NodeB transmits FPACH in the pre-determined time slot to the UE for uplink synchronization setup. Otherwise, there is no response and the UE fails in setting up the uplink synchronization. In this process, the conditions for the above-mentioned uplink synchronization setup indicate that the peak value is in the designated window, and the corresponding access threshold is reached.

Another aspect of this invention relates to a synchronization apparatus for the uplink based on UE JT technology. The synchronization apparatus includes:

A processor located in the UE and configured in the following way:

During downlink, UE sets up the downlink synchronization;

UE calculates downlink channel estimation;

UE, according to the calculated downlink channel estimation, constructs transport matrix A, and the uplink synchronization code matrix d to be transmitted by UE. Then the UE obtains the uplink pilot frequency transmission data s, which includes the latest downlink channel fading and multi-path information.

Another processor located in the NodeB and configured in the following way:

During uplink, NodeB receives the uplink pilot frequency transmission data s, and sets up the uplink synchronization. When NodeB correlates the above-mentioned pilot frequency, there is only one path so the NodeB can obtain the exact maximum peak value. This helps the NodeB in determining the advance and the delay of UE transmission.

More advantageously, the UE calculates the downlink channel estimation to receive BCH or DwPCH for channel estimation. Moreover, the above-mentioned channel estimation includes the channel estimation and weight slide toward the multiple received BCH or DwPCH.

In the synchronization apparatus described above, the processor in the UE, according to the calculated downlink channel estimation, constructs the transport matrix A, and the uplink synchronization code matrix d to be transmitted by the UE. The uplink pilot frequency transmission data s, transport matrix A and the uplink synchronization code matrix have the following relationship:

$$d = A*s + n$$

where n is the noise component.

Furthermore, the method of Zero-Force Block Linear Equalizer is used according to the following formula to produce the uplink pilot frequency transmission data s:

$$\hat{S}hd_{c,MMSE-BLE} = (A^H A + \sigma_n^2 I)^{-1} A^H d = R_{MMSE}^{-1} A^H d$$

where I is the unit matrix, $A^H d$ is the matching filter process, and $R_{MMSE}^{-1}$ is the de-correlation multi-user detection operation.

Alternatively, in the apparatus described above, the processor in the UE, according to the calculated downlink channel estimation result, constructs the transport matrix A, and the uplink synchronization code matrix d to be transmitted by the UE. The uplink pilot frequency transmission data s, transport matrix A and the uplink synchronization code matrix have the following relationship:

$$d = A*s + n$$

where n is noise component.

Furthermore, the method of Minimum Mean Square Error (MMSE-BLE) is used according to the following formula to produce the uplink pilot frequency transmission data s:

$$\hat{S}_{c,MMSE-BLE} = (A^H A + \sigma_n^2 I)^{-1} A^H d = R_{MMSE}^{-1} A^H d$$

where $\sigma_n^2$ is noise power, I is unit matrix, $A^H d$ is the matching filter process, and $R_{MMSE}^{-1}$ is the de-correlation multi-user detection operation.

More advantageously, when the processor in the NodeB receives the uplink pilot frequency transmission data s and sets up the uplink synchronization, the NodeB receives the uplink pilot frequency s and uses respectively 8 uplink pilot frequency codes with the receiving signals to correlate for 8 times to evaluate the accessed uplink pilot frequency codes to determine whether the conditions for the uplink synchronization setup are met. If the conditions are met, the NodeB transmits FPACH in the pre-determined time slot to the UE for uplink synchronization setup. Otherwise, there is no response and the UE fails in setting up the uplink synchronization. In this process, the conditions for the above-mentioned uplink synchronization setup indicate that the peak value is in the designated window, and the corresponding access threshold is reached.

This invention enables the TD-SCDMA base station to accurately transmit the downlink synchronization information to the UE for its uplink setup. Therefore, the correlation values of the uplink synchronization codes and multi-path can be differentiated. As a result, the success rate in the process of the uplink synchronization setup can be improved.

Embodiment One

Figure 3:
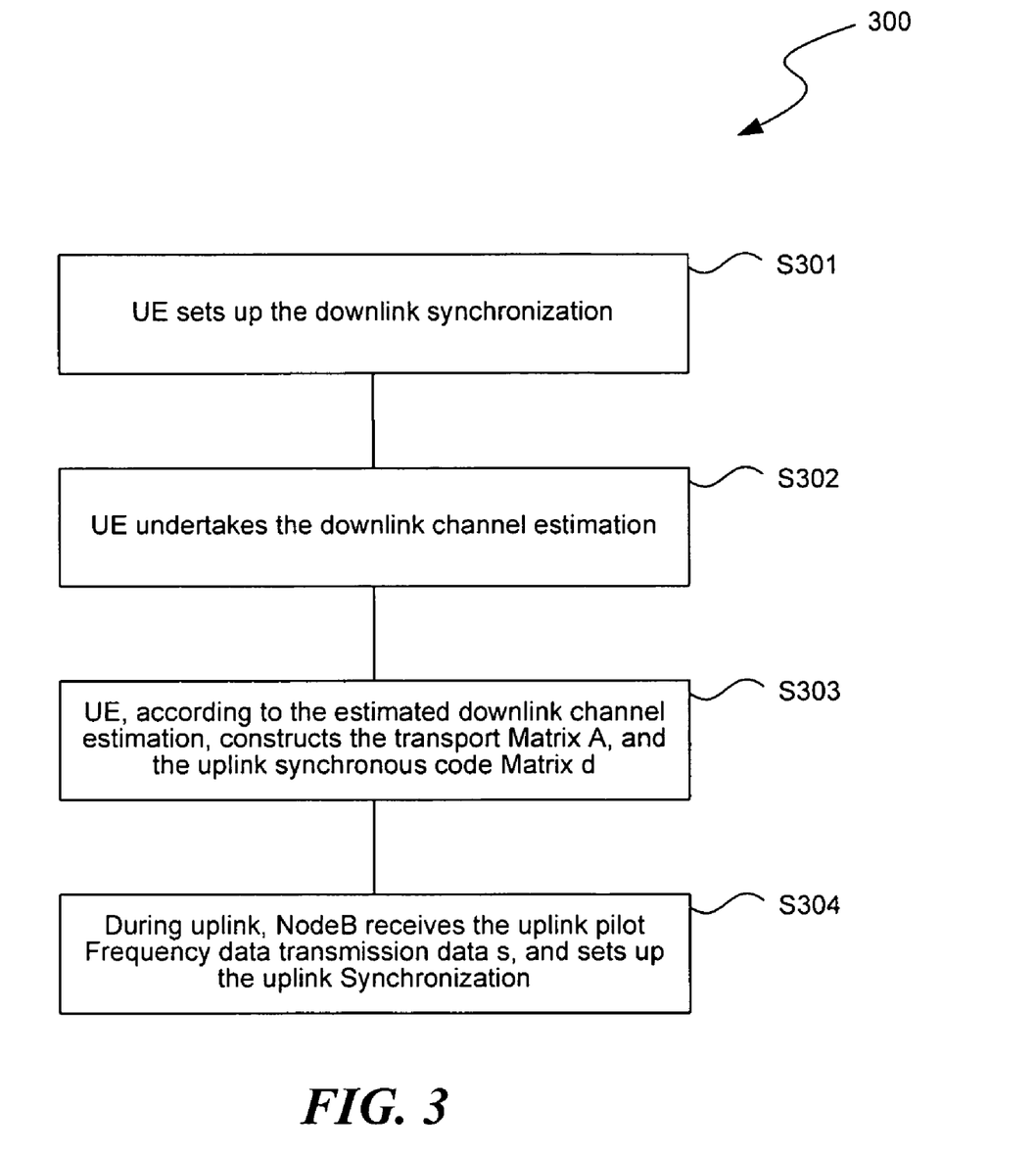
FIG. 3 is the flow chart of the uplink synchronization method in one embodiment of this invention.

The first embodiment of the invention presents a method for uplink synchronization. FIG. 3 shows a flow chart of an embodiment of an uplink synchronization method. As illustrated in FIG. 3, the uplink synchronization method 300 is based on UE JT technology, and includes the following steps:

S301: during downlink, UE sets up the downlink synchronization,

S302: UE undertakes the downlink channel estimation.

In one embodiment, the UE undertakes the downlink channel estimation, and receives BCH or DwPCH for channel estimation. More advantageously, the UE receives BCH or DwPCH for multiple times, and undertakes channel estimation and weighting slide.

S303: UE, according to the estimated downlink channel estimation result, constructs transport matrix A, and the uplink synchronization code matrix d to be transmitted by the UE. Then the UE obtains the uplink pilot frequency transmission data s, which includes the latest downlink channel fading and multi-path information.

According to one embodiment, the UE, according to BCH after the weighting slide or DwPCH channel estimation, constructs transport matrix A. Suppose the uplink synchronization code transmitted by UE is Matrix s, and the received signal by NodeB is d, since the time between the uplink and the downlink is quite short, the correlation efficient is quite large, about 0.9997. As disclosed by the above theoretical analysis, the transport matrixes of the uplink and the downlink are considered to be approximately the same. Then the signal at the receiver end is displayed in the following formula:

$$d = A*s + n$$

where $$d = [d0, 15 \times \{0\}]^T, s = \begin{bmatrix} s_1 \\ s_2 \\ \vdots \\ s_{128} \end{bmatrix}$$

Suppose d0 is the 128 chip uplink synchronization code originally transmitted, and the signal d0 transmitted by UE is replaced by s, the downlink reads BCH channel (TS0), whose window width W is 16, then when d is constructed, the back of d0 is inserted by 0 whose number is 15. Then d is 143×1 dimension matrix, s is 128×1 dimension matrix, and n is the estimated noise matrix. Matrix A is 143×128 dimension matrix, as a result of the cyclic shift of h, which is w×1 dimension, constructed by channel impulse estimation. Matrixes A, and h go as follows:

$$A = \begin{bmatrix} h & & & \\ & h & & \\ & & \ddots & \\ & & & h \end{bmatrix}, h = \begin{bmatrix} h_1 \\ h_2 \\ h_3 \\ \vdots \\ h_W \end{bmatrix}$$

The above receiving signal model can produce the following result, according to different service circumstances:

when ZF-BLE is utilized, the formula is $\hat{S}_{c,ZF-BLE} = (A^H A)^{-1} A^H d = R_{ZF}^{-1} A^H d$ when MMSE-BLE is utilized, the formula is $\hat{S}_{c,MMSE-BLE} = (A^H A + \sigma_n^2 I)^{-1} A^H d = R_{MMSE}^{-1} A^H d$ In the above two formulas, $\sigma_n^2$ is noise power, I is unit matrix, $A^H d$ is the matching filter process, and $R_{MMSE}^{-1}$ is the de-correlation multi-user detection operation.

Then when ZF-BLE is used, the formula $\hat{S}_{c,ZF-BLE} = (A^H A)^{-1} A^H d = R_{ZF}^{-1} A^H d$ can produce the uplink pilot frequency transmission data s;

When MMSE-BLE is used, the formula $\hat{S}_{c,MMSE-BLE} = (A^H A + \sigma_n^2 I)^{-1} A^H d = R_{MMSE}^{-1} A^H d$ can produce the uplink pilot frequency transmission data s.

S304: during uplink, the NodeB receives the uplink pilot frequency transmission data s, and sets up the uplink synchronization. When NodeB undertakes the correlation with the above-mentioned pilot frequency, there is only one path, and exact maximum peak value can be got, in order that NodeB confirms the advance and the delay transmitted by the UE.

In one embodiment, when the NodeB receives uplink pilot frequency transmission data s and sets up the uplink synchronization, the NodeB receives the uplink pilot frequency s, and uses 8 uplink pilot frequency codes with the receiving signals to undertake the correlation for 8 times, to ensure that the accessed uplink pilot frequency codes are evaluated, and that the conditions for the uplink synchronization setup are met. If the conditions are met, the NodeB transmits FPACH in the pre-determined time slot to the UE for uplink synchronization setup. Otherwise, there is no response and the UE fails in setting up the uplink synchronization. In this process, the conditions for the above-mentioned uplink synchronization setup indicate that the peak value is in the designated window, and the corresponding access threshold is reached.

Embodiment Two

Figure 4:
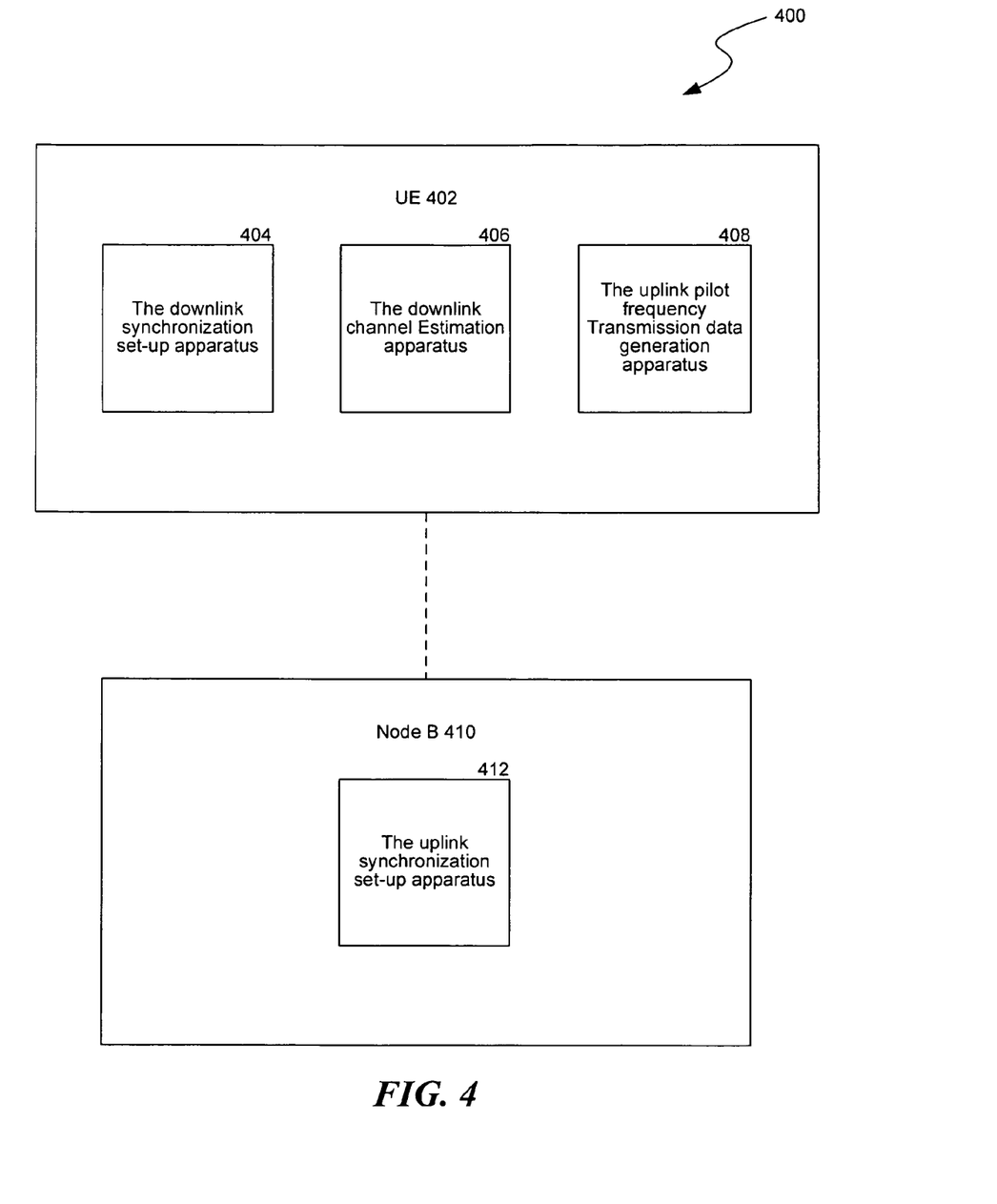
FIG. 4 is the structure chart of the uplink synchronization system in one embodiment of this invention.

The second embodiment relates to an uplink synchronization system. FIG. 4 is a structure chart of the uplink synchronization system in accordance with one embodiment. The synchronization system 400 of the uplink system uses UE JT technology. The system 400 includes:

In the UE 402:

The downlink synchronization setup apparatus 404 that sets up the downlink synchronization for UE.

The downlink channel estimation apparatus 406 that undertakes the estimation for the downlink channel. In one embodiment, the downlink channel estimation apparatus 406 in the UE undertakes the downlink channel estimation, and receives BCH or DwPCH for channel estimation. More advantageously, the downlink channel estimation apparatus 406 receives BCH or DwPCH for multiple times, and undertakes channel estimation and weighting slide.

The uplink pilot frequency transmission data generation apparatus 408, according to the estimated downlink channel estimation, constructs the transport matrix A and the uplink synchronization code matrix d to be transmitted by the UE. Then the uplink pilot frequency transmission data s is obtained, which involves the latest downlink channel fading and multi-path information.

The pilot frequency transmission data generation apparatus 408, according to BCH after the weighting slide, or DwPCH channel estimation, constructs transport matrix A. Suppose the uplink synchronization code transmitted by UE is Matrix s, the received signal by NodeB is d, since the time between the uplink and the downlink is quite short, the correlation coefficient is quite large, about 0.9997. From the above theoretical analysis, the transport matrixes of the uplink and the downlink are considered to be approximately the same. Then the signal at the receiver end is displayed in the following formula:

$$d = A*s + n$$

where $$d = [d0, 15 \times \{0\}]^T, s = \begin{bmatrix} s_1 \\ s_2 \\ \vdots \\ s_{128} \end{bmatrix}$$

Suppose d0 is the 128 chip uplink synchronization code originally transmitted. The signal d0 transmitted by UE is replaced by s. The downlink reads BCH channel (TS0), whose window width W is 16. Therefore, when d is constructed, the back of d0 is inserted by 0 whose number is 15. Then d is 143×1 dimension matrix, s is 128×1 dimension matrix, and n is the estimated noise matrix. Matrix A is 143×128 dimension matrix, as a result of the cyclic shift of h, which is w×1 dimension, constructed by channel impulse estimation. Matrixes A, and h go as follows:

$$A = \begin{bmatrix} h & & & \\ & h & & \\ & & h & \\ & & & \ddots \\ & & & & h \end{bmatrix}, \quad h = \begin{bmatrix} h_1 \\ h_2 \\ h_3 \\ \vdots \\ h_W \end{bmatrix}$$

The above receiving signal model can produce the following result, according to different service circumstances:

when ZF-BLE is utilized, the formula is $\hat{S}_{c,ZF-BLE} = (A^H A)^{-1} A^H d = R_{ZF}^{-1} A^H d$.

when MMSE-BLE is utilized, the formula is $\hat{S}_{c,MMSE-BLE} = (A^H A + \sigma_n^2 I)^{-1} A^H d = R_{MMSE}^{-1} A^H d$ In the above two formulas, $\sigma_n^2$ is noise power, I is unit matrix, $A^H d$ is the matching filter process, and $R_{MMSE}^{-1}$ is the de-correlation multi-user detection operation.

Then when ZF-BLE is used, the formula $\hat{S}_{c,ZF-BLE} = (A^H A)^{-1} A^H d = R_{ZF}^{-1} A^H d$ can produce the uplink pilot frequency transmission data s;

When MMSE-BLE is used, the formula $\hat{S}_{c,MMSE-BLE} = (A^H A + \sigma_n^2 I)^{-1} A^H d = R_{MMSE}^{-1} A^H d$ can produce the uplink pilot frequency transmission data s.

In the Node B 410:

The uplink synchronization setup apparatus 412, during uplink, receives the uplink pilot frequency transmission data s, and sets up the uplink synchronization.

When NodeB undertakes the correlation with the above-mentioned pilot frequency, there is only one path, and exact maximum peak value can be got, in order that NodeB finalizes the advance and the transmission delay of the UE.

In one embodiment, when the NodeB receives uplink pilot frequency transmission data s and sets up the uplink synchronization, the NodeB receives the uplink pilot frequency s, and uses 8 uplink pilot frequency codes with the receiving signals to undertake the correlation for 8 times, to ensure that the accessed uplink pilot frequency codes are evaluated, and that the conditions for the uplink synchronization setup are met. If the conditions are met, NodeB transmits FPACH in the predetermined time slot to UE for uplink synchronization setup. Otherwise, there is no response and UE fails in setting up the uplink synchronization. In this process, the conditions for the above-mentioned uplink synchronization setup indicate that the peak value is in the designated window, and the corresponding access threshold is reached.

Embodiment Three

Figure 5:
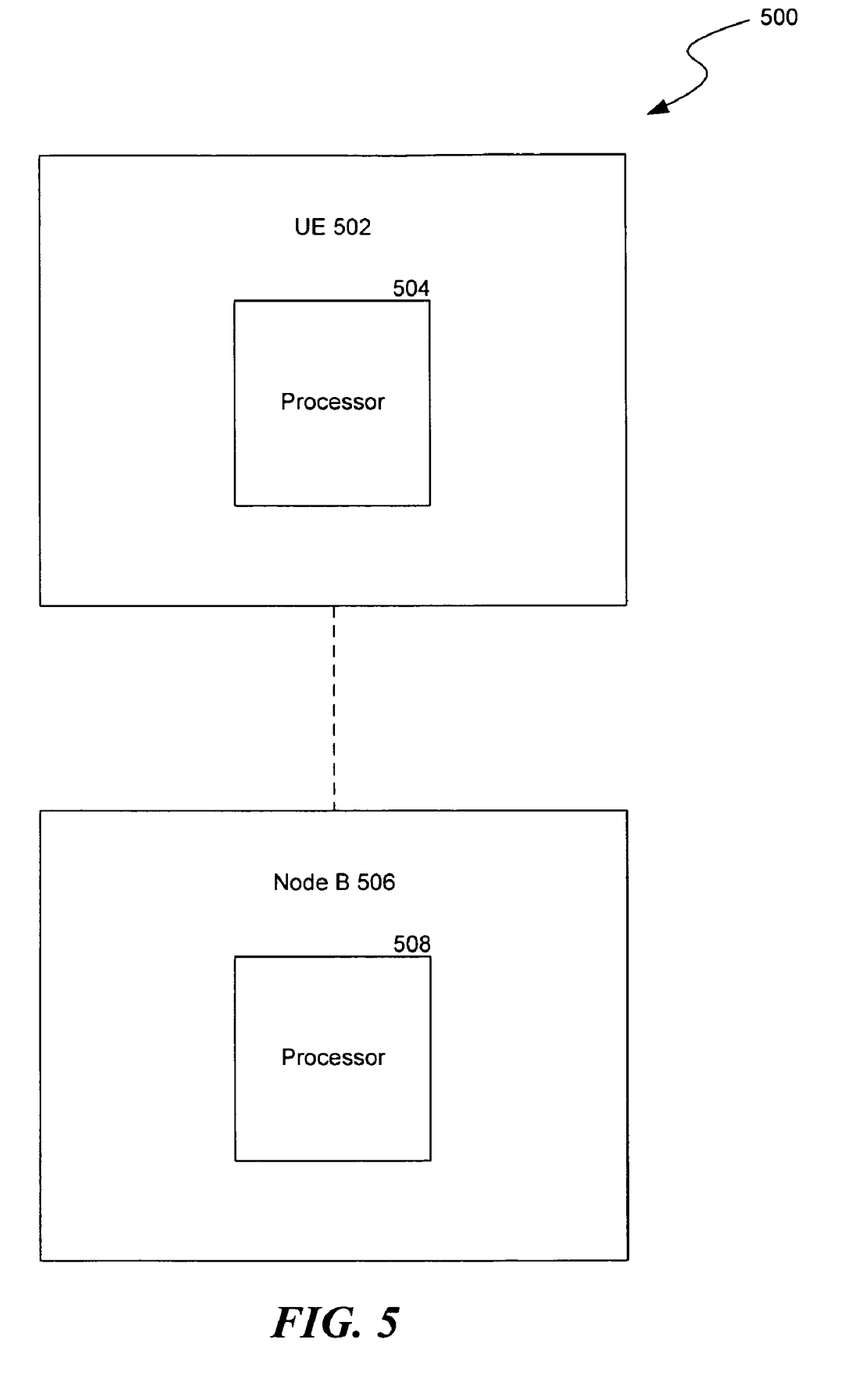
FIG. 5 is the structure chart of the uplink synchronization apparatus in one embodiment of this invention.
Figure 6:
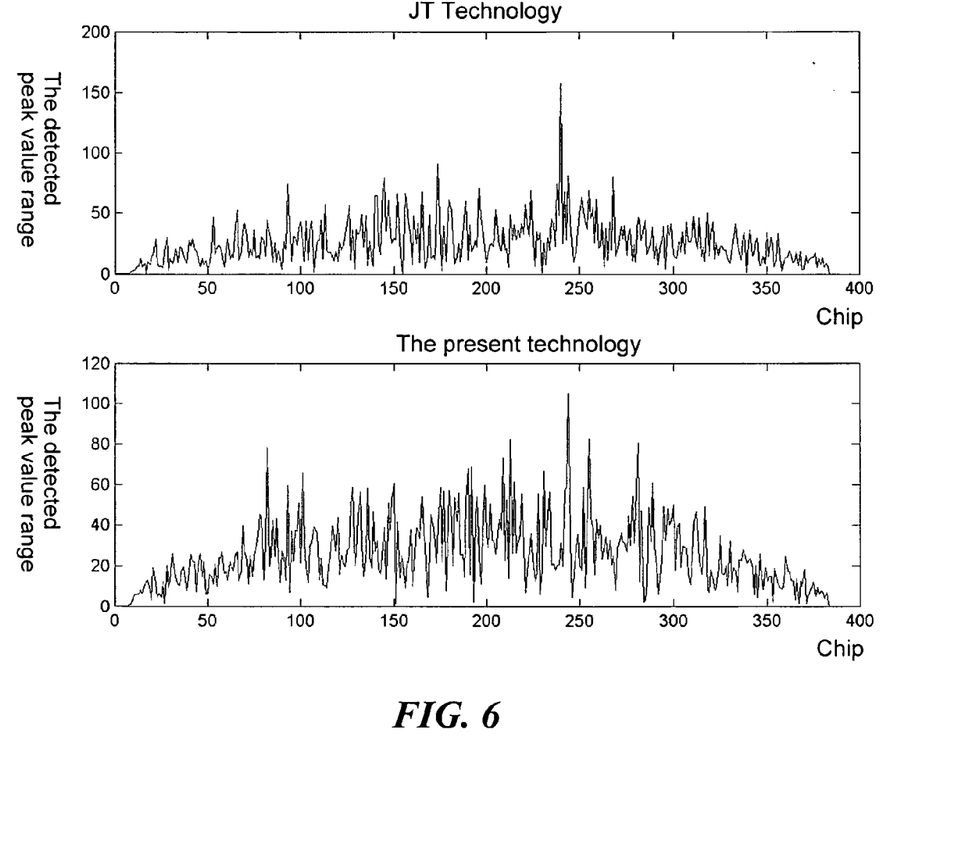
FIG. 6 is one example of simulation outcome of an uplink synchronization technique in accordance to one embodiment of the invention.

The third embodiment of the invention provides an uplink synchronization apparatus. FIG. 5 illustrates a structure chart for the uplink synchronization apparatus 500. The apparatus 500 is based on UE JT technology and includes the following components:

A processor 504 located in the UE 502. The processor 504 is configured in the following way:

During downlink, the UE sets up the downlink synchronization.

The UE undertakes the downlink channel estimation, and receives BCH or DwPCH for channel estimation. More advantageously, UE receives BCH or DwPCH for multiple times, and undertakes channel estimation and weighting slide.

The UE, according to the estimated downlink channel estimation result, constructs transport matrix A, and the uplink synchronization code matrix d to be transmitted by UE. Then UE obtains the uplink pilot frequency transmission data s, which includes the latest downlink channel fading and multi-path information.

In one embodiment, the UE, according to BCH after the weighting slide, or DwPcH channel estimation, constructs transport matrix A. Suppose the Uplink synchronization code transmitted by UE is Matrix s, and the received signal by NodeB is d. Since the time between the uplink and the downlink is quite short, the correlation efficient is quite large, about 0.9997. From the above theoretical analysis, the transport matrixes of the uplink and the downlink are considered to be approximately the same. Then the signal at the receiver end is displayed in the following formula:

$$d = A*s + n$$

where $$d = [d0, 15 \times \{0\}]^T, s = \begin{bmatrix} s_1 \\ s_2 \\ \vdots \\ s_{128} \end{bmatrix}$$

Suppose d0 is the 128 chip uplink synchronization code originally transmitted. The signal d0 transmitted by UE is replaced by s. The downlink reads BCH channel (TS0), whose window width W is 16. Therefore, when d is constructed, the back of d0 is inserted by 0 whose number is 15. Then d is 143×1 dimension matrix, s is 128×1 dimension matrix, and n is the estimated noise matrix. Matrix A is 143×128 dimension matrix, as a result of the cyclic shift of h, which is w×1 dimension, constructed by channel impulse estimation. Matrixes A, and h go as follows:

$$A = \begin{bmatrix} \begin{bmatrix} h \end{bmatrix} & & & \\ & \begin{bmatrix} h \end{bmatrix} & & \\ & & \ddots & \\ & & & \begin{bmatrix} h \end{bmatrix} \end{bmatrix}, h = \begin{bmatrix} h_1 \\ h_2 \\ h_3 \\ \vdots \\ h_W \end{bmatrix}$$

The above receiving signal model can produce the following result, according to different service circumstances:

when ZF-BLE is utilized, the formula is $\hat{S}_{c,ZF\text{-}BLE} = (A^H A)^{-1} A^H d = R_{ZF}^{-1} A^H d$ when MMSE-BLE is utilized, the formula is $\hat{S}_{c,MMSE\text{-}BLE} = (A^H A + \sigma_n^2 I)^{-1} A^H d = R_{MMSE}^{-1} A^H d$ In the above two formulas, $\sigma_n^2$ is noise power, I is unit matrix, $A^H d$ is the matching filter process, and $R_{MMSE}^{-1}$ is the de-correlation multi-user detection operation.

Then when ZF-BLE is used, the formula $\hat{S}_{c,ZF\text{-}BLE} = (A^H A)^{-1} A^H d = R_{ZF}^{-1} A^H d$ can produce the uplink pilot frequency transmission data s;

When MMSE-BLE is used, the formula $\hat{S}_{c,MMSE\text{-}BLE} = (A^H A + \sigma_n^2 I)^{-1} A^H d = R_{MMSE}^{-1} A^H d$ can produce the uplink pilot frequency transmission data s.

The synchronization apparatus 500 further includes a processor 508 located in the Node B506. The processor 508 is configured in the following way:

During uplink, when NodeB undertakes the correlation with the above-mentioned pilot frequency, there is only one path, and exact maximum peak value can be got, in order that NodeB finalizes the advance and the transmission delay of the UE.

More advantageously, when the NodeB receives uplink pilot frequency transmission data s and sets up the uplink synchronization, the NodeB receives the uplink pilot frequency s, and uses 8 uplink pilot frequency codes with the receiving signals to undertake the correlation for 8 times, to ensure that the accessed uplink pilot frequency codes are evaluated, and that the conditions for the uplink synchronization setup are met. If the conditions are met, NodeB transmits FPACH in the pre-determined time slot to UE for uplink synchronization setup. Otherwise, there is no response and UE fails in setting up the uplink synchronization. In this process, the conditions for the above-mentioned uplink synchronization setup indicate that the peak value is in the designated window, and the corresponding access threshold is reached.

Simulation Outcome

FIG. 4 illustrates simulated outcome of the synchronization method, system or apparatus in accordance with the invention. In the simulation outcome illustrated by FIG. 4, the simulation condition is Case2, 3 km/h, Ec/No=−10 dB. From the simulation outcome, the peak value of the JT technology is quite prominent, and the peak value using conventional technology is not quite apparent and difficult to detect.

Using the disclosed technique, a TD-SCDMA base station can more accurately transmit downlink synchronization information to a UE for uplink setup, and the correlation values of the uplink synchronization codes and multi-path can be differentiated. Therefore, the success rate in the process of the uplink synchronization setup can be improved.

The above-mentioned is just the preferred embodiment of this invention, not to be used for restricting the scope of this invention. All the similar changes or modifications based on the scope of this invention should fall in the scope of this invention.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A uplink synchronization method, comprising:
   during downlink, a UE setting up downlink synchronization;
   UE undertaking downlink channel estimation;
   UE, according to the downlink channel estimation, constructing transport matrix A and uplink synchronization code matrix d to be transmitted by UE;
   UE obtaining uplink pilot frequency transmission data s based on the matrix A and the matrix d, wherein s contains latest downlink channel fading and multi-path information;
   during uplink, a NodeB receiving the uplink pilot frequency transmission data s, and setting up uplink synchronization,
   wherein the uplink pilot frequency transmission data s, the transport matrix A and the uplink synchronization code matrix d have a following relationship:

$$d = A*s = n$$

wherein n is noise component,
   and wherein, by using a method of Zero-Force Block Linear Equalizer the uplink pilot frequency transmission data s is calculated via a formula as below:

$$\hat{S}_{c,ZF\text{-}BLE} = (A^H A)^{-1} A^H d = R_{ZF}^{-1} A^H d$$

wherein I is a unit matrix, $A^H d$ is a matching filter process, and $R_{MMSE}^{-1}$ is a de-correlation multi-user detection operation.

2. A uplink synchronization method, comprising:
   during downlink, a UE setting up downlink synchronization;
   UE undertaking downlink channel estimation;
   UE, according to the downlink channel estimation, constructing transport matrix A and uplink synchronization code matrix d to be transmitted by UE;
   UE obtaining uplink pilot frequency transmission data s based on the matrix A and the matrix d, wherein s contains latest downlink channel fading and multi-path information;
   during uplink, a NodeB receiving the uplink pilot frequency transmission data s, and setting up uplink synchronization,
   wherein the uplink pilot frequency transmission data s, the transport matrix A and the uplink synchronization code matrix d have a following relationship:

$$d = A*s = n$$

wherein n is noise components,
   and wherein, by using a method of Minimum Mean Square Error (MMSE-BLE), the uplink pilot frequency transmission data s is calculated via a formula as below:

$$\hat{S}_{c,MMSE\text{-}BLE} = (A^H A + \sigma_n^2 I)^{-1} A^H d = R_{MMSE}^{-1} A^H d$$

wherein $\sigma_n^2$ is noise power, I is a unit matrix, $A^H d$ is a matching filter process, and $R_{MMSE}^{-1}$ is a de-correlation multi-user detection operation.

3. A uplink synchronization system, comprising:

In a UE, a downlink synchronization setup apparatus setting up a downlink synchronization for UE, a downlink channel estimation apparatus estimating a downlink channel, an uplink pilot frequency transmission data generation apparatus, according to the downlink channel estimation, constructing a transport matrix A and a uplink synchronization code matrix d to be transmitted by UE, and producing a uplink pilot frequency transmission data s based on the matrix A and the matrix d, wherein s contains latest downlink channel fading and multi-path information;

in a NodeB, a uplink synchronization setup apparatus receiving the uplink pilot frequency transmission data s and setting up uplink synchronization, wherein the uplink pilot frequency transmission data s, the transport matrix A and the uplink synchronization code matrix d have a following relationship:

$$d = A * s = n$$

wherein n is noise component, and wherein, by using a method of Zero-Force Block Linear Equalizer the uplink pilot frequency transmission data s is calculated via a formula as below:

$$\hat{S}_{c,ZF-BLE} = (A^H A)^{-1} A^H d = R_{ZF}^{-1} A^H d$$

wherein I is a unit matrix, $A^H d$ is a matching filter process, and $R_{MMSE}^{-1}$ is a de-correlation multi-user detection operation.

4. A uplink synchronization system, comprising:

In a UE, a downlink synchronization setup apparatus setting up a downlink synchronization for UE, a downlink channel estimation apparatus estimating a downlink channel, an uplink pilot frequency transmission data generation apparatus, according to the downlink channel estimation, constructing a transport matrix A and a uplink synchronization code matrix d to be transmitted by UE, and producing a uplink pilot frequency transmission data s based on the matrix A and the matrix d, wherein s contains latest downlink channel fading and multi-path information;

in a NodeB, a uplink synchronization setup apparatus receiving the uplink pilot frequency transmission data s and setting up uplink synchronization, wherein the uplink pilot frequency transmission data s, the transport matrix A and the uplink synchronization code matrix d have a following relationship:

$$d = A * s = n$$

wherein n is noise components, and wherein, by using a method of Minimum Mean Square Error (MMSE-BLE), the uplink pilot frequency transmission data s is calculated via a formula as below:

$$\hat{S}_{c,MMSE-BLE} = (A^H A + \sigma_n^2 I)^{-1} A^H d = R_{MMSE}^{-1} A^H d$$

wherein $\sigma_n^2$ is noise power, I is a unit matrix, $A^H d$ is a matching filter process, and $R_{MMSE}^{-1}$ is a de-correlation multi-user detection operation.

* * * * *